United States Patent [19]

Bauer et al.

[11] Patent Number: 4,779,851

[45] Date of Patent: Oct. 25, 1988

[54] ADJUSTABLE-LENGTH GAS SPRING WITH PERMANENT RELEASE MECHANISM

[75] Inventors: Hans-Peter Bauer; Hans J. Bauer; Ludwig Stadelmann, all of Altdorf; Herbert Wolf, Nuremberg, all of Fed. Rep. of Germany

[73] Assignee: Fritz Bauer & Söhne OHG, Altdorf, Fed. Rep. of Germany

[21] Appl. No.: 6,702

[22] Filed: Jan. 22, 1987

[30] Foreign Application Priority Data

Jan. 28, 1986 [DE] Fed. Rep. of Germany ....... 3602441

[51] Int. Cl.$^4$ .............................................. F16F 9/32
[52] U.S. Cl. .................................. 267/64.12; 188/300
[58] Field of Search ...................... 188/300; 267/64.11, 267/64.12, 120, 124; 248/162.1, 631, 148, 429, 425; 251/230

[56] References Cited

U.S. PATENT DOCUMENTS

| | | | |
|---|---|---|---|
| 2,351,194 | 6/1944 | Davies | 248/162.1 |
| 3,656,593 | 4/1972 | Bauer | 188/300 |
| 4,139,182 | 2/1979 | Nagase et al. | 267/120 |
| 4,200,332 | 4/1980 | Brauning | 297/300 |
| 4,221,238 | 9/1980 | Madsen | 251/230 |

FOREIGN PATENT DOCUMENTS 0052832 1/1986 European Pat. Off. .
3325798 1/1985 Fed. Rep. of Germany .

Primary Examiner—Douglas C. Butler
Assistant Examiner—Mark T. Le
Attorney, Agent, or Firm—Browdy and Neimark

[57] ABSTRACT

An adjustable-length gas spring has a compressed gas-filled housing in which a piston with a piston rod is sealingly guided. At one end of the housing is provided a valve with a valve pin for connecting or separating two housing chambers, the valve pin being movable into the housing against the force exerted thereon by the gas pressure with the valve in the open position. The pin is movable against such force when the valve is in the closed position. There is also a permanent release mechanism for securing the valve pin when the valve is in the open position. In order to permit a particularly simple operation of the gas spring, the permanent release mechanism is formed by a bi-stable locking mechanism constructed in the manner of a mechanical flip-flop and which is coupled to the valve pin, being operated by the insertion thereof into the housing.

9 Claims, 3 Drawing Sheets

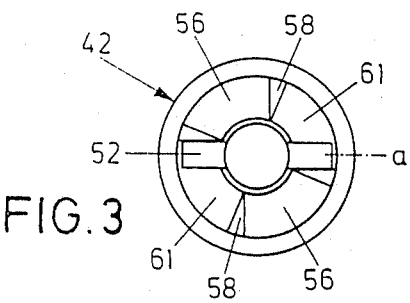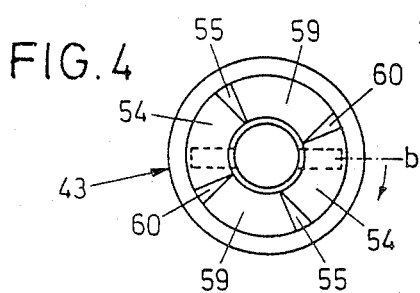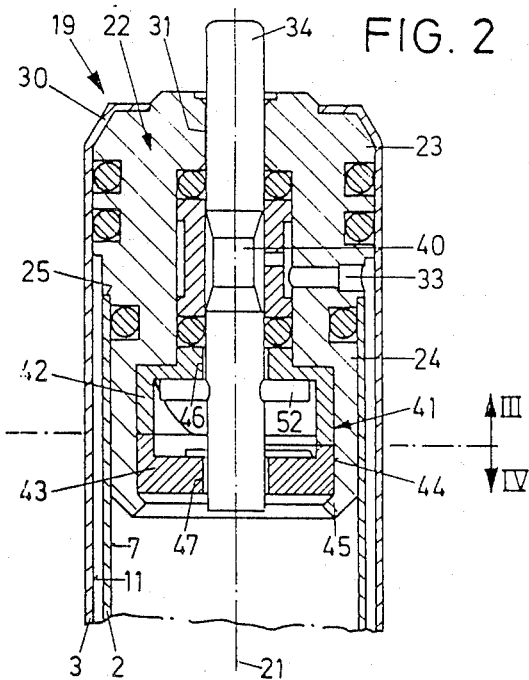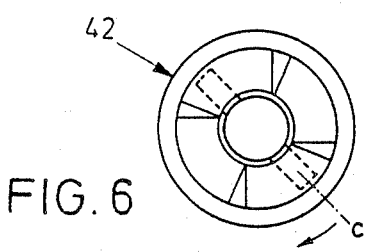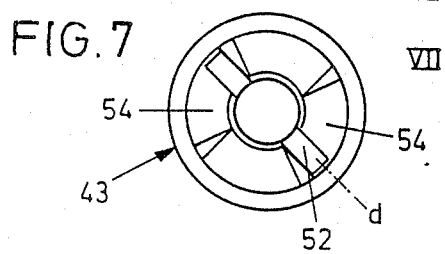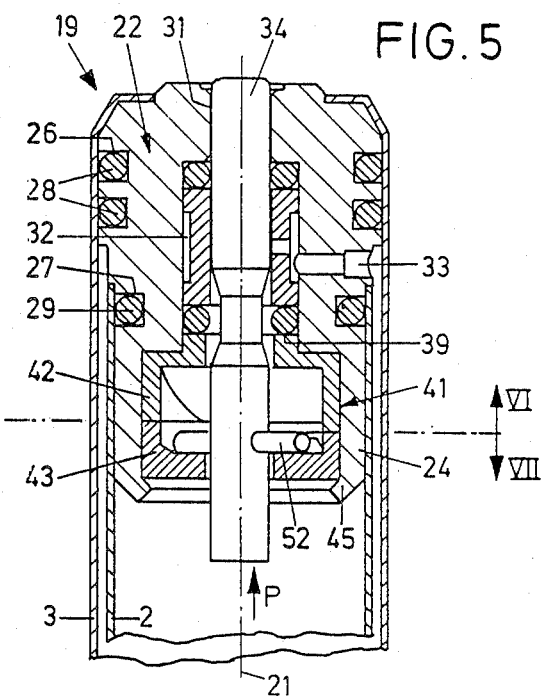

ADJUSTABLE-LENGTH GAS SPRING WITH PERMANENT RELEASE MECHANISM

FIELD OF THE INVENTION

This invention relates to an adjustable-length gas spring comprising an at least partly compressed gas-filled housing having at least one cylinder; a piston slidably arranged in the cylinder and engaging on the inner wall thereof with a gasket and separating the inner area of said cylinder into two housng chambers, the piston being connected to a piston rod extending from one end of the housing and sealed with respect thereto; and a valve housing a valve pin for connecting or separating the two housing chambers.

BACKGROUND OF THE INVENTION

Such adjustable-length gas springs are in particular used for adjusting tilting back rests on chairs or for adjusting so-called synchronous mechanism on office chairs, in which the seat and back rest tilting take place synchronously with one another. In connection with such chairs there is a need to be able to fix the back rest and optionally the seat shell in a given tilt position and to be able to adjust to another position. In addition, with a permanently open gas spring, it must be possible to rock the back rest and optionally the seat shell.

In the case of a gas spring of the aforementioned type known from DE-OS No. 3325798, a connecting link guide is provided for an actuating or control lever for operating the valve pin. In said connecting link guide the actuating lever can be pivoted once freely for opening and then immediate closing of the valve. It can also be fixed in the pivoting position corresponding to the open valve position by pivoting at right angles to the main actuating direction, so that the valve pin remains in its pressed in position, in which the valve is continuously open. In the case of this known gas spring, the valve is arranged at the casing end opposite to the piston rod outlet.

In an adjustable-length gas spring of the aforementioned type, such as is known from U.S. Pat. No. 4,200,332, the valve is arranged in the vicinity of the piston displaceable in the cylinder. The valve pin required for operating the valve is guided outwards through a bore in the piston rod. The permanent release mechanism of this adjustable-length gas spring is formed by a separate slider, which enables the actuating lever necessary for displacing the valve pin to be locked in its pivoted position.

European patent specification No. 0052832 discloses a permanent release mechanism for a gas spring, which is fitted as a separate component to the piston rod of an adjustable-length gas spring, whose control takes place through the hollow piston rod. This known release mechanism has a very complicated construction. It only permits a bi-stable operation, i.e. it is necessary to operate an operating knob or button twice to adjust the length of the gas spring.

SUMMARY OF THE INVENTION

It is an object of the present invention to provide an adjustable-length gas spring with a permanent release mechanism which can be operated in a particularly simple manner.

According to the invention, there is provided an adjustable-length gas spring comprising an at least partly compressed gas-filled housing having at least one cylinder; a piston slidingly arranged in the cylinder and engaging on the inner wall thereof with a gasket and separating the inner area of said cylinder into two housing chambers, the piston being connected to a piston rod extending from one end of the housing and sealed with respect thereto; a valve having a valve pin for connecting or separating the two housing chambers, the valve pin being movable against a force exerted thereon by the gas pressure in the housing with the valve in the open position and movable by said force into a closed position of the valve; and a permanent release mechanism for securing the valve pin when the valve is in the open state; wherein the permanent release mechanism is formed by a bi-stable locking mechanism which is integrated into the valve, coupled to the valve pin and operated by inserting the same into the housing.

As a result of the arrangement according to the invention, the valve pin can be brought into a permanently open position of the valve by simple actuations in the direction of the valve pin and as used for the conventional opening and closing of the valve. In the case of the gas spring according to the invention, it is consequently a type of mechanical flip-flop, i.e. a bi-stable control member.

According to one embodiment of the invention, the locking mechanism has sloping guidance surfaces for a guide member whereby, on forcing the valve pin into the housing, said surfaces alternately bring the valve pin into an upper rest position or a lower locking position.

This arrangement makes it possible for opening the valve without engaging in a permanently released position to move the valve pin up to a first pressure point in which the valve is already opened and following the corresponding adjustment of the gas spring closing the valve again by merely releasing the valve pin. Thus, there is no passage through the lower locking position.

Further advantages and features of the invention will become apparent from the ensuing description of an embodiment taken in conjunction with the drawings.

BRIEF DESCRIPTION OF THE DRAWINGS

FIG. 2 is a longitudinal section through the valve of the adjustable-length gas spring in the closed position;

FIG. 3 is a view of an upper guidance part of a permanent release mechanism of the valve taken on the line III—III in FIG. 2;

FIG. 4 is a view of a lower guidance part of the permanent release mechanism taken on the line IV—IV in FIG. 2;

FIG. 5 is a vertical section through the valve in a lower intermediate position of the valve pin;

FIG. 6 is a view of the upper guidance part taken on the line VI—VI in FIG. 5;

FIG. 7 is a view of the lower guidance part taken on the line VII—VII in FIG. 5;

DETAILED DESCRIPTION OF PREFERRED EMBODIMENT

Figure 1:
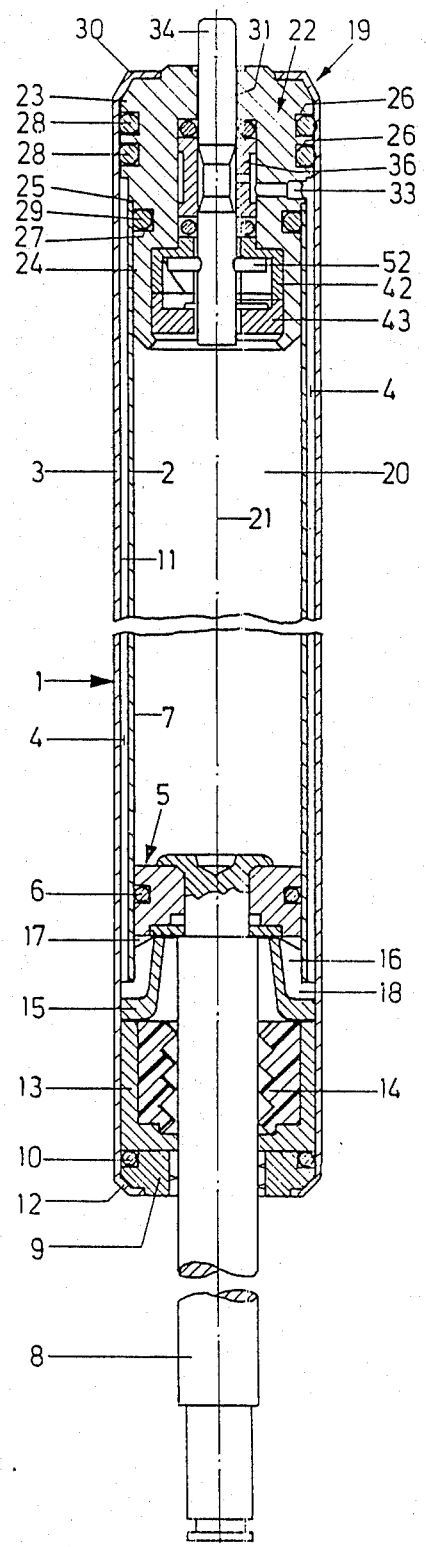
FIG. 1 is a longitudinal section through one embodiment of an adjustable-length gas spring according to the invention.

Referring to the drawings, the adjustable-length gas spring shown in FIG. 1 has a housing 1, which substantially comprises two tubes mounted concentrically within one another and having different diameters, namely an inner cylinder 2 and an outer cylinder 3. As a result of the different diameters of the inner cylinder 2 and outer cylinder 3, an annular chamber 4 is formed between the two cylinders. An approximately annular piston 5 is axially displaceably disposed in the inner cylinder 2 and the outer circumference of the piston is sealed in a gas-tight manner with respect to the inner wall 7 of the inner cylinder 2 by means of a gasket ring 6. The piston 5 is fixed to one end of a piston rod 8 which is coaxially guided in the housing 1. The piston rod 8 is led out of one end of the housing 1, which end is closed by a closure disc 9, whose outer circumference is sealed in a gas-tight manner with respect to the inner wall 11 of the outer cylinder 3 by means of a ring seal 10. The closure disc 9 is axially outwardly retained by means of a flanged-over portion 12 of the outer cylinder 3. On the inside, a cup-shaped sleeve 13 engages with the closure disc 9 and receives a multiple lip seal 14, whose lips sealingly engage against the piston rod 8. This prevents an outward escape of gas along the surface of the piston rod 8.

Within the housing 1, a centering piece 15 engaging the inner wall 11 of the outer cylinder 3 is supported against the sleeve 13, said centering piece being provided with ribs 16, on which the inner wall 7 of the inner cylinder 2 is radially supported, i.e. centred. The inner cylinder 2 is also firmly axially supported on said ribs 16, i.e. is axially fixed at one end. Owing to the fact that only ribs 16 are provided for the centering and axial support of inner cylinder 2, the annular chamber 4 is connected in said area to a chamber 17 within the inner cylinder 2, which chamber is defined between the piston 5, the piston rod outlet end of the housing 1 and the inner wall 7 of inner cylinder 2. Thus, overflow conduits 18 are formed between the chamber 17 and the annular chamber 4 between the ribs 16.

A valve 19 is disposed at the other end of the housing 1 by means of which a chamber 20 located in the inner cylinder 2 between the piston 5 and the valve 19 can be connected to or separated from the annular chamber 4 and therefore the other housing chamber 17.

The complete gas spring, including the valve 19, is constructed substantially symmetrically to the median longitudinal axis 21. The valve 19 has a valve body 22, which is formed from an outer portion 23 and an inner portion 24. The outer portion 23 engages with the inner wall 11 of the outer cylinder 3, so that the valve body 22 is centred relative to the outer cylinder 3. The also cylindrical, smaller diameter inner portion 24 engages with the inner wall 7 of the inner cylinder 2, so that there is centering between the valve body 22 and the inner cylinder 2 and consequently also between the inner cylinder 2 and the outer cylinder 3. In the transition region between the portions 23 and 24, a stop collar 25 is formed, by means of which the valve body 22 axially engages against the inner cylinder 2. In the vicinity of the portion 23 on the one hand and portion 24 on the other hand, ring seals 28, 29 are provided in corresponding annular grooves 26, 27 and by means thereof there is a gas-tight connection between the portion 24 and the inner wall 11 of the outer cylinder 3 on the one hand and between the inner portion 24 and the inner wall 7 of the inner cylinder 2 on the other. The valve body is retained axially outwards by a flanged-over portion 30 of the outer cylinder 3, so that once again the inner cylinder 2 is axially outwardly fixed.

In the vicinity of its outer portion 23, the valve body 22 is provided with a cylindrical, coaxial guide bore 31 to which, in the direction of the housing chamber 20, is connected a valve body inner chamber 32 essentially still located in the outer portion 23. This inner chamber 32 has a larger diameter than the guide bore 31. An overflow conduit 33 radially passing through the valve body issues into said inner chamber 32 and issues at its outside in the annular chamber 4.

The valve body 22 contains a valve pin 34, which projects outwards out of the valve body 22 and therefore out of the gas spring. This substantially cylindrical valve pin 34 is guided in the guide bore 31. An inner ring seal 35 is provided at the transition between the guide bore 31 and the inner chamber 32 which seal is axially outwardly secured through the transition between the inner chamber 32 and the guide bore 31 and which on the one hand radially engages on the valve pin 34 and on the other on the wall of the inner chamber 32 so that a gas discharge through the guide bore 31 is prevented. The inner ring seal 35 is axially fixed in the direction of the housing chamber 20 by a spacing sleeve 36, which is provided with one or more passage openings 37 constructed as throttling bores so that gas can also pass into the spacing sleeve 36.

An inner ring seal 38 also engages on the end of the spacing sleeve 36 facing the chamber 20, said ring seal being in radial contact with the inner wall of the inner chamber 32 and with the valve pin 34. It engages with a contact surface 39 axially with respect to the housing chamber 20.

In the inoperative position of the valve pin 34 shown in FIG. 2 in which the valve 19 is closed, a constriction 40 of the valve pin 34 is located between the inner ring seals 35, 38, i.e. the housing chamber 20 is separated in gas-tight manner from the annular chamber 4 and therefore from the housing chamber 17. By moving the valve pin 34 into the valve body 22, the constriction 40 bridges the inner ring seal 38 facing the housing chamber 20, so that gas can flow from the housing chamber 17 through the annular chamber 4 and valve body inner chamber 32 into the housing chamber 20 and vice-versa. The basic construction of this compressed gas-filled, adjustable-length gas spring is known, e.g. from German Patent Specification No. 1812282 (corresponding to U.S. Pat. No. 3,656,593).

According to an embodiment of the present invention, a permanent release mechanism 41 is integrated into the valve body 22 and namely in the inner portion 24 on the side facing the housing chamber 20. The mechanism 41 serves to keep the valve 19, when required, in a permanently open position, in which the gas spring is consequently released. Thus, said mechanism 41 makes it possible to secure the valve pin 34 in a position in which it is inserted into the valve body 22 or housing 1 against the gas pressure acting thereon.

This mechanism has two guidance parts 42, 43, which cannot rotate with respect to one another. They are arranged in a cylindrical recess 44 in the inner portion 24 and are axially held there by an inwardly drawn-over edge 45 of the valve body 22. The contact surface 39 for the inner ring seal 38 is constructed on the upper guidance part 42. The two guidance parts 42, 43 are constructed in substantially ring-cylindrical manner and have a respective bore 46, 47 traversed by the valve pin 34 and whose diameter is larger than that of the valve pin 34 passing through the same, so that in the case of the described opening of the valve the gas can also flow through said bores 46, 47. The edges 48, 49 of the two guidance parts 42, 43 directed against one another are provided with at least one protuberance 50 and an associated recess 51, which engage in one another, so that a given, non-rotatable positioning of the two guidance parts 42, 43 with respect to one another is ensured.

A large number of cam or guidance surfaces, whose construction and function will be subsequently described, is provided on the narrow, outer, allround, circular edges 48, 49 of the two guidance parts 42, 43. Fundamentally, said cam or guidance surfaces serve to bring the valve pin 34 into a position during the pressing into the valve body 22 or housing 1 and accompanied by simultaneous rotation, in which it is held in the forced in position, i.e. with the valve 19 open and, accompanied by further rotation, from which it can again be brought into a position in which it is forced out of the valve body, in which position the valve 19 is closed. For this purpose, the valve pin 34 has a guide pin 52 positioned at right angles to the median longitudinal axis 21 and located radially with respect to the valve pin 34, said pin being positioned between the two guidance parts 42, 43 and within their outer edges 48, 49. On forcing in the valve pin 34 against the gas pressure into the valve body 22, said guide pin is moved, i.e. pivoted tangentially to the median longitudinal axis 21 onto the cam or guidance surfaces of the lower guidance part 43. On releasing the valve pin 34, it is forced outwards from the valve body 22 by the gas pressure, the corresponding movement taking place on the cam or guidance surfaces of the upper guidance part 42.

If, as shown in FIG. 2, the valve 19 is closed, i.e. the valve pin 34 is located in its extended position, the guide pin 52 are in its rest position a in a recess 53 in the upper guidance part 42. On operating the valve pin 34 by forcing same inwardly against the gas pressure-, the guide pin 52 is moved with the valve pin 34 and parallel to itself into a lower intermediate position b, in which it engages against a sloping guidance surface 54 on the lower guidance part 43.

Figure 11:
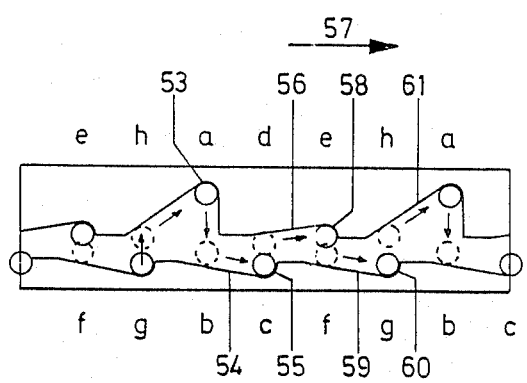
FIG. 11 shows a development of the upper and lower guidance parts showing the individual operating positions of the permanent release mechanism.

If force against the valve pin 34 is released while the guide pin 52 is in position b, it is clear that the internal gas pressure will act to close the valve by restoring the valve pin 34 to position a (FIGS. 2 and 11). Returning to and starting from the from the intermediate position b, said guidance surface 54 is still away from the upper rest position a, i.e. slopes towards the housing chamber 20. On further forcing the valve pin 34 into the valve body 22, accompanied by rotation of the valve pin 34 about the axis 21 in the direction 57 (see FIG. 11), the guide pin 52 slides on said guidance surface 54 into a lower intermediate position c, where the rotary movement is ended by a stop 55. On releasing the valve pin 34, i.e. on removing the compression exerted thereon from the outside, the valve pin 34 is moved outwards by the gas pressure in housing 1, there being no rotary movement of valve pin 34 during this discharge movement. Following a short discharge movement, the guide pin 52 in an intermediate position d engages on a sloping guidance surface 56 in the upper guidance part 42.

Figure 9:
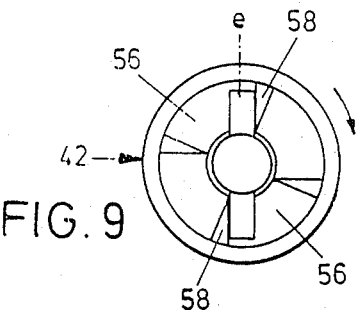
FIG. 9 is a view of the upper guidance part taken on the line IX—IX in FIG. 8.
Figure 10:
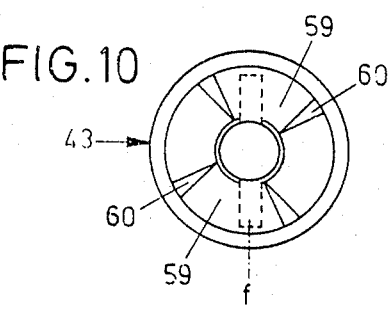
FIG. 10 is view of the lower guidance part taken on the line X—X in FIG. 8.
Figure 8:
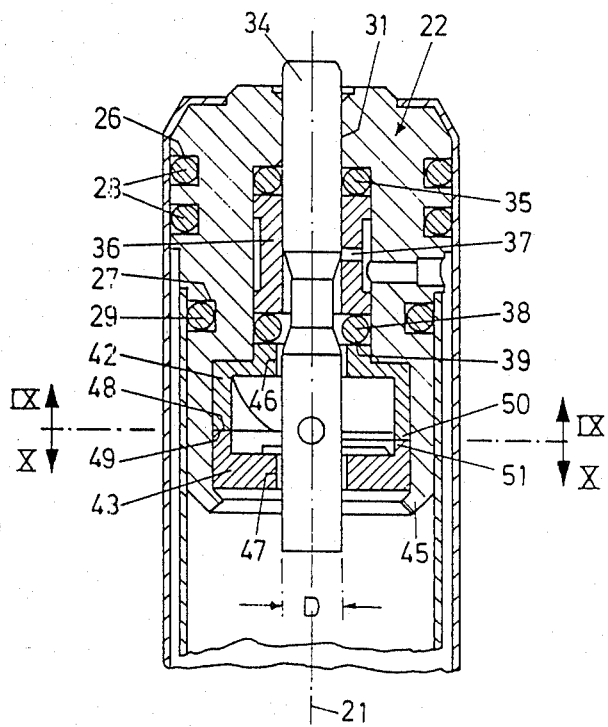
FIG. 8 is a longitudinal section through the valve in a lower locking position of the valve pin in the case of a permanently open valve.

Based on the rotation direction 57 of the valve pin 34, said guidance surface 56 is away from the lower guidance part, i.e. is directed outwards or in the direction of the recess 51. As a result of the force P exerted by the gas pressure on the valve pin 34, the guide pin 52 slides on said guidance surface 56 up to a locking stop 58 in the upper guidance part 42. In this lower locking position e (FIGS. 8 and 9), the valve pin 34 is in a lower stable rest position, in which the valve 19 is open. It is held in the lower locking position e, as in the upper rest position a by the gas pressure acting on the valve pin 34. If the valve pin 34 is to be returned to its upper rest position a, then a force directed into the valve body 22 is again exerted thereon, so that without rotation it passes from the locking position e downwards into an intermediate position f and then onto a sloping guidance surface 59 in the lower guidance part 43, which is constructed identically to the sloping guidance surface 54. In the case of further pressure on the valve pin 34, accompanied by simultaneous rotation of the latter over said sloping guidance surface, the guide pin 52 slides against a stop 60 at the lower end of said guidance surface 59 into an intermediate position g, where the rotary movement of valve pin 34 is ended. If the force exerted on valve pin 34 is now removed, it is forced without rotation into an intermediate position h against a sloping guidance surface 61 defining recess 53 and formed in the upper guidance part 42 and against which it slides into the upper rest position a, accompanied by simultaneous rotation of the valve pin 34.

As can be gathered from the drawings, the individual guidance surfaces, stops and positions are arranged diametrically to one another, so that the guide pin 52 extending radially on either side of valve pin 34 is guided symmetrically, which prevents tilting of the valve pin 34. Obviously, in place of a 180° spacing, it is also possible to provide a 90° spacing, so that the guidance surfaces slope more, which facilitates the operating movements and leads to a reduction of the necessary rotary movements of the valve pin 34.

The distances between the stops 55 and 60 and the guidance surfaces 56 and 61 facing them in the axial direction and the axial spacing between the locking stop 58 and guidance surface 59 is in each case somewhat larger than the diameter of the guide pin 52.

It is fundamentally also possible that the unit comprising the two guide parts 42, 43 is freely rotatable with respect to the valve body. In this case, said unit is rotated by means of the guide pin 52.

If, as mentioned above a, the valve pin 34 is only pressed from the upper rest position a into the valve body 22 to the extent that the guide pin 52 passes into the intermediate position b, then the latter has the function of a pressure point. In this position, the valve 19 is already open, so that simple length adjustments of the gas spring are possible. If valve pin 34 has not already been turned, then through relieving the valve pin the gas spring can be directly closed again, without any need to pass through the lower locking position e.

The following equation applies to the force P forcing the valve pin 34 out of the housing 1:

$$P = p \times \frac{D^2}{4}$$

in which D is the diameter of the valve pin 34 and p is the overpressure of the gas in the housing 1 with respect to atmospheric pressure.

This force P, plus the frictional forces which occur must be overcome on pressing the valve pin 34 into the valve body 22. This force is applied by using actuating levers in known manner.

We claim:

1. An adjustable-length gas spring comprising an at least partly compressed gas-filled housing having at least one cylinder; a piston slidingly arranged in the cylinder and engaging on the inner wall thereof with a gasket and separating the inner area of said cylinder into two housing chambers, the piston being connected to a piston rod extending from one end of the housing and sealed with respect thereto; a valve for connecting or separating the two housing chambers and a valve pin slidable in said valve to effect opening and closing of said valve, the valve pin being movable to open the valve against a gas pressure force in the housing and being movable by said force to close the valve; and a permanent release mechanism for securing the valve pin when the valve is in the open state the permanent release mechanism being formed by a bi-stable locking mechanism which is integrated into the valve, coupled to the valve pin and operated by inserting the same into the housing, said locking mechanism having guidance parts that include sloping guidance surfaces for a guide pin whereby, on forcing the valve pin into the housing said surfaces alternately bring the valve pin into an upper rest position or a lower locking position, and wherein an intermediate position forming the lower pressure point on one of the guidance parts is associated with an upper rest position on the other guidance part and between which the guide pin can be moved without any rotary movement, the valve being opened in said intermediate position.

2. A gas spring according to claim 1, wherein the locking mechanism is constructed in the manner of a mechanical flip-flop.

3. A gas spring according to claim 1, wherein the guidance surfaces are constructed in a ring cylinder cross-section and bring about a relative rotary movement between the valve pin and the guidance surfaces.

4. A gas spring according to claim 1, wherein the guidance surfaces are constructed facing one another on two guidance parts.

5. A gas spring according to claim 4, wherein the guidance parts are non-rotatable relative to one another.

6. A gas spring according to claim 1, wherein the valve is arranged at the other end of the housing and has a valve body receiving and guiding the valve pin, the locking mechanism being arranged in said valve body.

7. An adjustable-length gas spring comprising an elongated compressed-gas filled housing defining a hollow cylinder with first and second ends; a piston slidably arranged in the cylinder and engaging on the inner wall thereof with a gasket and separating the inner area of said cylinder into two housing chambers; the piston being connected to a piston rod extending from said first end of the housing and sealed with respect thereto; a valve at said second end and including a valve body with a valve passageway extending therethrough for connecting or separating the two housing chambers and a valve pin axially slidable in said valve to effect opening and closing of said valve passageway, the valve pin being axially movable in a first direction to open the valve against a gas pressure force from the housing and being axially movable in a second direction by said force to close the valve; and control means for selectively controlling the axial position of said valve pin alternatively to open said valve to a non-locked open position or to a locked open position, said control means being integrated into said valve body on a side thereof facing the hollow cylinder, said control means comprising a first guidance part and a second guidance part fixed relative to one another and defining therebetween a cam engaging groove, and cam means connected to said valve pin for travelling within said cam engaging groove, said first guidance part forming a lower pressure point for said cam means whereby axial movement of said valve means from a closed position to said non-locked open position causes said cam means to abut said lower pressure point, said control means including permanent release means for controllably securing the valve pin when the valve is in the open state so as to effect said locked position.

8. An adjustable-length gas spring according to claim 7 wherein said cam means comprises a guide pin which extends through said valve pin in a generally radial direction, and wherein said first and second guidance parts constitute a ring cylinder cross-section.

9. An adjustable-length gas spring according to claim 8 wherein said valve body is unitary and has a ring cylindrical recess on a portion thereof facing said hollow cylinder, said first and second guidance parts being fixed within said ring cylindrical recess.

* * * * *